(12) United States Patent
Erdmenger et al.

(10) Patent No.: US 7,657,583 B2
(45) Date of Patent: Feb. 2, 2010

(54) CALCULATING RECOVERY TIME OF AN APPLICATION SYSTEM

(75) Inventors: Joerg Erdmenger, Waldenbuch (DE); Hans-Ulrich Oldengott, Jettingen (DE)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 11/291,440

(22) Filed: Dec. 1, 2005

(65) Prior Publication Data

US 2006/0173870 A1    Aug. 3, 2006

(30) Foreign Application Priority Data

Dec. 29, 2004    (EP)    ................... 04107049

(51) Int. Cl.
*G06F 7/00*    (2006.01)
(52) U.S. Cl. ........................ 707/204; 711/162
(58) Field of Classification Search ............... None
See application file for complete search history.

(56) References Cited

U.S. PATENT DOCUMENTS

| | | | |
|---|---|---|---|
| 5,574,897 A | 11/1996 | Hermsmeier et al. | |
| 7,062,621 B2 * | 6/2006 | Mizuno et al. | 711/162 |
| 7,222,133 B1 * | 5/2007 | Raipurkar et al. | 707/200 |
| 7,305,421 B2 * | 12/2007 | Cha et al. | 707/202 |
| 2004/0210577 A1 | 10/2004 | Kundu et al. | |

FOREIGN PATENT DOCUMENTS

EP    1359506 A2    11/2003

\* cited by examiner

*Primary Examiner*—Mohammad Ali
*Assistant Examiner*—Huawen Peng
(74) *Attorney, Agent, or Firm*—Stephen J. Walder, Jr.; Jeffrey S. LaBaw

(57) ABSTRACT

Mechanisms are provided for calculating a recovery time ($t_r$) of an application system in a computer system. The mechanisms tune the computer system dynamically. A recovery time ($t_r$) is calculated and controlled within flexible predefined time slices and compared to a predefined time period ($t_0$). A trigger is set in the case in which the calculated recovery time ($t_r$) exceeds the predefined time period ($t_0$). The mechanisms determine a type of redolog used during a backup process and a corresponding recovery speed value associated with the type of redolog. The recovery time is calculated based on the type of redolog used during the backup process and the corresponding recovery speed value associated with the type of redolog.

20 Claims, 6 Drawing Sheets

CALCULATING RECOVERY TIME OF AN APPLICATION SYSTEM

BACKGROUND

The invention relates in general to a method for calculating a recovery time of an application system in a computer system for tuning the computer system dynamically so an agreed recovery time can be secured.

The invention further refers to an appropriate computing system, a computer program and a computer program product.

The use of and dependency on data in today's society is rapidly expanding. Now more than ever, businesses continuously rely on data in order to operate. Businesses and their customers demand that the data be available and accurate. Those data may originate from different areas. The main part of those data within a company are stored within a so-called database management system. Such a database management system serves to store and manage large amounts of data.

Over time in a typical computer environment, large amounts of data are typically written to and retrieved from storage devices connected to the computer. As more data are exchanged with the storage devices, it becomes increasingly difficult for the data owner to reproduce these data if the storage devices fail. Internal influences can lead to a breakdown of data carrier or of processors. A software mistake, mostly based on a bad design can also occur.

The consequences of data loss can be fatal for a business company, resulting in an economic damage. Therefore, regarding data storages, it is common practice to generate a copy of said data which can be restored on demand.

So one of the most important aspects within a database management system is the protection of one's organization's data from logical errors, disasters and other failures by storing backup and archive copies of data on offline storage. A so-called backup describes generally the step of copying data within a computer system on a storage medium as well as the copy itself. Doing a regular backup alone is no guaranteed protection against data loss since there may be internal influences to the backup system which make the backup invalid.

An execution of such a backup can result in utilisation of a large number of resources for a long period of time because of the large amount of data to be stored. Nevertheless, it is very important to execute backups regularly, for that several versions of backups are available in case of a restore. The so-called recovery of data provides the database after restoring with complete functionality, so that all data of the database are available without restrictions.

One way of protecting data is by backing up the data to backup media, e.g., tapes or disks. Such backup is typically performed manually or automatically at preset intervals using backup software. The backup media are then stored away in a safe location. Various conventional mechanisms for protecting and recovering data are available for businesses.

The so-called backup systems vary in the levels of protection they provide, the amount of time required to restore the backed up data and the difficulty associated with their integration with the businesses' other systems and applications.

Generally, the success of these mechanisms is measured in terms of "data availability" i.e., how quickly a system, a database, or a file can be restored after a failure or corruption of data. In the following any system which can be an object of a backup and restoring process, respectively, will be subsumed under the term "application system".

There are mainly two types of backup procedures and systems available.

One type of backup can be referred to as an "offline" backup. In an offline backup, an application system that is being backed up has to be quiesced and cannot be used during the backup process since it is "offline" for users. Moreover, users may be unable to access the files during a full system backup. Accordingly, the cost of performing such backups is greater in terms of user productivity and/or system resources.

FIG. 1 illustrates such an offline backup. At a point in time $t_1$ an application system DB will be shutdown or set offline. Now for a period of time $t_{b1}$ the movement of actual data objects takes place from the application system DB to a backup storage TSM as indicated by reference number 1. After completion of this backup process the application system DB will be set online or start up again at a point in time $t_2$. From there on logs of the application activity, so-called redologs 2 will be written by the application system DB and saved to the backup storage system TSM until the next backup process starts or the application goes offline at a point in time $t_3$.

Another type of backup can be referred to as an "online" backup which is illustrated in FIG. 2. In an online backup, an application system DB that is being backed up is placed in a different mode at a point in time $t_1$, called "online backup mode", and stays in this mode during the backup process, namely within a period of time $t_{b11}$. The mechanics of this online backup mode or hot backup mode is proprietary to a specific application. The similarity for all application systems which are regarded within the scope of the present invention is the creation of more detailed log information describing application activity relevant to the data repository to enable later restoration of this repository during recovery. This additional log information is made persistent within the redologs of the application system. Typically, a backup process performed during the period of time $t_{b11}$ performs a full system backup every time the files are backed up as indicated by reference number 1. A full system backup ensures that a complete and consistent set of data objects on the application system DB is copied to a secondary or redundant storage, namely a backup storage system TSM. In case of an online backup all redologs produced during the online backup mode $t_{b11}$, need to be saved by the backup storage system TSM as indicated by reference number 2. After completion of this backup process the application system DB will be set in normal operation mode at a point in time $t_2$. Since there may be open transactions within the application system DB at the end of the backup process at point in time $t_2$ the latest redologs 3 need to be saved in addition in a time period $t_{b12}$ when all transactions are closed which where open during $t_{b11}$. This means a complete consistent set of application data exists within the backup repository not before the point in time $t_3$ when this "delayed" redologs are saved. That means that a complete backup takes a period in time $t_{b1}$ corresponding to the sum $t_{b11}+t_{b12}$. An indicated period in time $t_{b2}$ shows that afterwards logs of the application activity, so-called redologs 4 will be written by the application system DB and saved to the backup storage system TSM until the next backup process starts or the application system DB goes offline at a point in time $t_4$.

A backup process can be established to backup data on a regular or periodic basis (e.g., daily, nightly, weekly, etc.).

However, as present business applications run virtually around the clock with little tolerance for any downtime, the time frame or window for backing up data is small if it exists. Recovering data often requires the application of a database to restore and recover logs of data. Generally, a log file is a list of actions that have occurred for the purpose of analysis at a later time, for diagnostic or measurement purposes. It is possible to maintain a temporary log of data transactions since the last save of data. When a user saves data to the database, the temporary log is wiped out. Normally, log files only contain forward information, thereby limiting the use and effectiveness of the log files in restoring information. Within the context of restoring and within the following description log files will be referred to as redologs. By definition, restoration is to a point in the past. The fact that redologs can only move information forward through time implies that they must be used in conjunction with some other forms of data restoration, such as restoring an offline full backup, in order to achieve a restoration to a point in the past. Restoration proceeds by overwriting the data with stored copies and by undoing the changes to the redologs. According to such a procedure it is very difficult to preview a specific time frame or window in which a recovery can be done.

Restoring of data corresponds to replace data of the so-called production computer with data of the backup stored on a backup storage system. Therefore, it is very important, that the backup is precisely done, because otherwise wrong data are brought in during restoring. In the worst case, the database is unusable after termination of the restoring.

There are different possibilities to proceed a backup.

A user executes a regular backup under optimised use of his resources. The backup of a database for example is executed according to the following steps. The data of the database are first copied. With respect to the used procedure, changes are saved during or after the backup.

If recovery is decided, the point in time at which the recovery has to be executed has to be determined. All data which have been deposited in the database until this point in time have to be restored. After restoring, the so-called recovery can be started, so that the complete functionality of the database is re-established.

The recovery time frame cannot be exactly estimated. Providers of a recovery service have no possibility to maintain predefined recovery times, because prediction of the time frame is hardly possible. Within the scope of the present invention the term "recovery time" covers the whole period of time necessary to restore backed up data and corresponding redologs as well as to recover those restored data with the associated redologs.

SUMMARY

According to the present invention, a method for calculating a recovery time of an application system in a computer system is provided for tuning the computer system dynamically, wherein the recovery time is calculated and controlled within flexible predefined time slices and compared to a predefined time period and a trigger is set in case that the calculated recovery time exceeds the predefined time period.

As already mentioned, the term "application system" covers, within the scope of the present invention, each kind of data storage, such as for example databases and applications and log files thereof.

In a possible embodiment of the method the calculated recovery time is isochronously displayed for review.

In another possible embodiment of the method according to the present invention the trigger initiates a warning signal for a user.

Furthermore, it is possible that the trigger enables simulator options on a corresponding client for modulating systematically backup performance parameters. With help of a simulation of a specific scenario a recovery time can be determined or at least estimated. This can be used again to modulate backup performance parameters accordingly. Such a simulation can also lead for example to an activation of additional appropriate system resources for reducing the recovery time.

In still another possible embodiment of the method according to the present invention the trigger initiates a warning signal combined with an activation of additional appropriate system resources for reducing the recovery time. It is possible that a simulation is performed first after the warning signal, leading then to an activation of additional appropriate system resources for reducing the recovery time.

In a further embodiment of the method, an execution plan for a backup is generated on the basis of the calculation of the recovery time. The execution plan comprises a schedule of the execution of the backup and the backup is executed on demand according to the execution plan schedule.

It is possible, that the recovery time is determined using the following system parameters: backup duration of saved data of the application system, an amount of associated redologs of the application system, throughput values for a backup of the redologs and an overall throughput for a recovery of the saved data with the associated redologs.

With help of these parameters the recovery time can always be calculated and compared with the predefined time period. If the calculated recovery time achieves the predefined time period, a provider can be informed and/or further backup- or restore-resources can be provided so that the predefined time period can be met.

There are different possibilities for implementing the method. There is a possibility only to give a warning signal to a corresponding provider. Furthermore, a warning signal can be combined with various options for optimising the backup. An automatic schedule of the backup with provision of appropriate backup- or restore-resources can also be provided. Another possibility is to execute in preliminary stages a simulation with respect to the environment of a specific user combined with the calculation of the recovery time frame together with the needed backup and restore resources.

The method, as described above, can be implemented whenever users have certain needs on how long their business can afford to stay offline with a certain application. Whenever questions like "how fast must an application be recovered" or "how much time is allowed until restore and recover is done" arise, the method can be applied.

According to an embodiment of the proposed method, parameters describing the state of the computer system are continuously collected and used to calculate the time, a full recovering of the data requested by a specific critical application system will take. Such a calculated value will either be displayed for review or also may be used as an input for a schedule mechanism. Thus, a user can define how long a specific business process allows him to be offline with a particular application. He may decide to schedule a new backup on demand if the predefined time period is exceeded.

The present invention further refers to a computing system for calculating a recovery time of an application system in a computer system for tuning the computer system dynamically, the system comprising a calculating unit for calculating the recovery time within flexible predefined time slices, a control unit for comparing the calculated recovery time with a predefined time period and an indicator unit for indicating when the calculated recovery time exceeds the predefined time period.

In a possible embodiment of the computing system according to the present invention, the system further comprises a monitor unit with the help of which the calculated recovery time can be isochronously displayed for review.

In still another embodiment of the computing system, the system further comprises a generating unit for generating an execution plan for a backup on the basis of the calculation of the recovery time, the execution plan comprising a schedule of the execution of the backup according to which the backup can be executed.

It is possible that the computing system determines the recovery time using the following system parameters: backup duration of saved data of the application system, an amount of associated redologs of the application system, throughput values for a backup of the redologs and an overall throughput for a recovery of the saved data with the associated redologs.

Furthermore, the invention covers a computer program product in a computer-readable storage medium for carrying out a method when the computer program is run on a computer. In one illustrative embodiment, the computer-readable storage medium is a tangible computer-readable storage medium, such as a memory, hard drive, floppy disk, CD-ROM, DVD-ROM, or the like.

Further features and embodiments of the invention will become apparent from the description and accompanying drawings.

It will be understood that the features mentioned above and those described hereinafter can be used not only in the combinations specified but also in other combinations or on their own, without departing from the scope of the present invention.

For purposes of clarity, the present discussion refers to network devices and concepts and terms of specific examples. However, the method and the computing system of the present invention may operate with a wide variety of types of network devices including networks and communication systems dramatically different from specific examples illustrated in the following drawings. It should be understood that while the invention is described in terms of a computer system, that the invention has applications in a variety of communication systems, such as advanced cable-television systems, advanced telephone networks or any other communication system that would benefit from the computing system or method according to the present invention. It is intended that the word "computer system" as used in the specification and claims be read to cover any communication system unless the context requires otherwise.

BRIEF DESCRIPTION OF THE SEVERAL VIEWS OF THE DRAWINGS

The invention is schematically illustrated in the drawings by way of example and is hereinafter explained in detail with reference to the following drawings.

DETAILED DESCRIPTION

Figure 1:
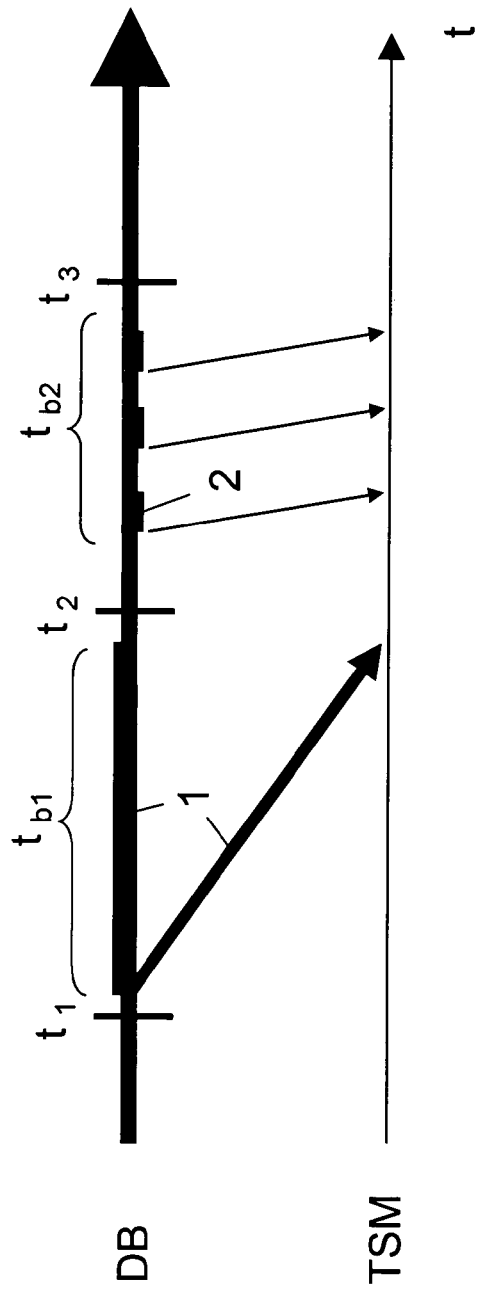
FIG. 1 shows a schematic diagram showing a time lapse of an offline backup according to the prior art.
Figure 2:
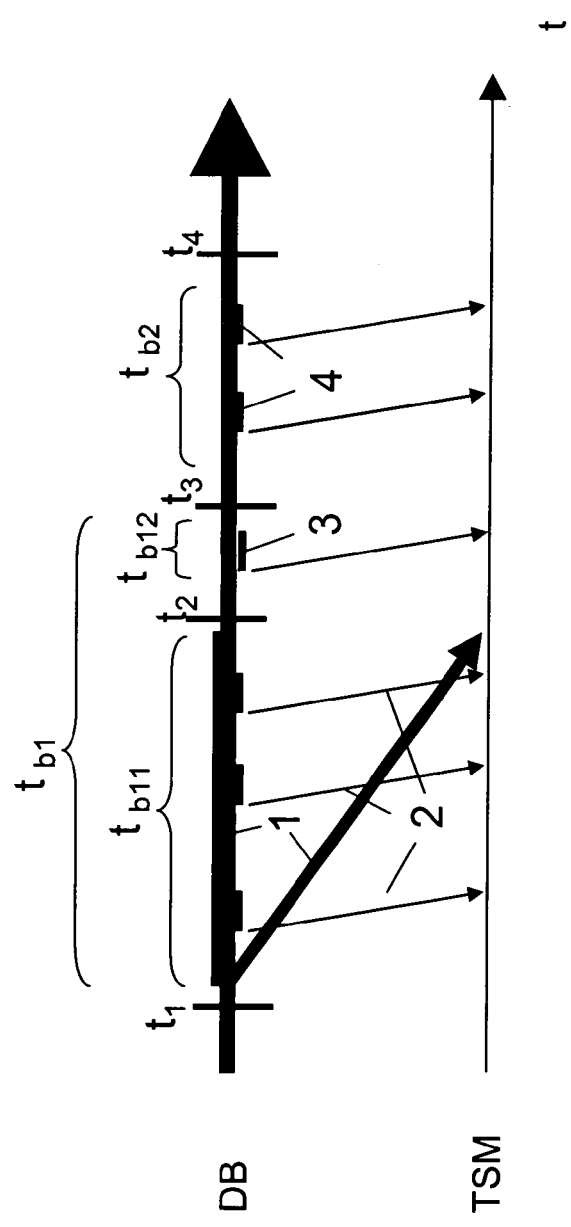
FIG. 2 shows a schematic diagram showing a time lapse of an online backup according to the prior art.

FIGS. 1 and 2 have already been described before in connection with the summary of the related art.

Figure 3:
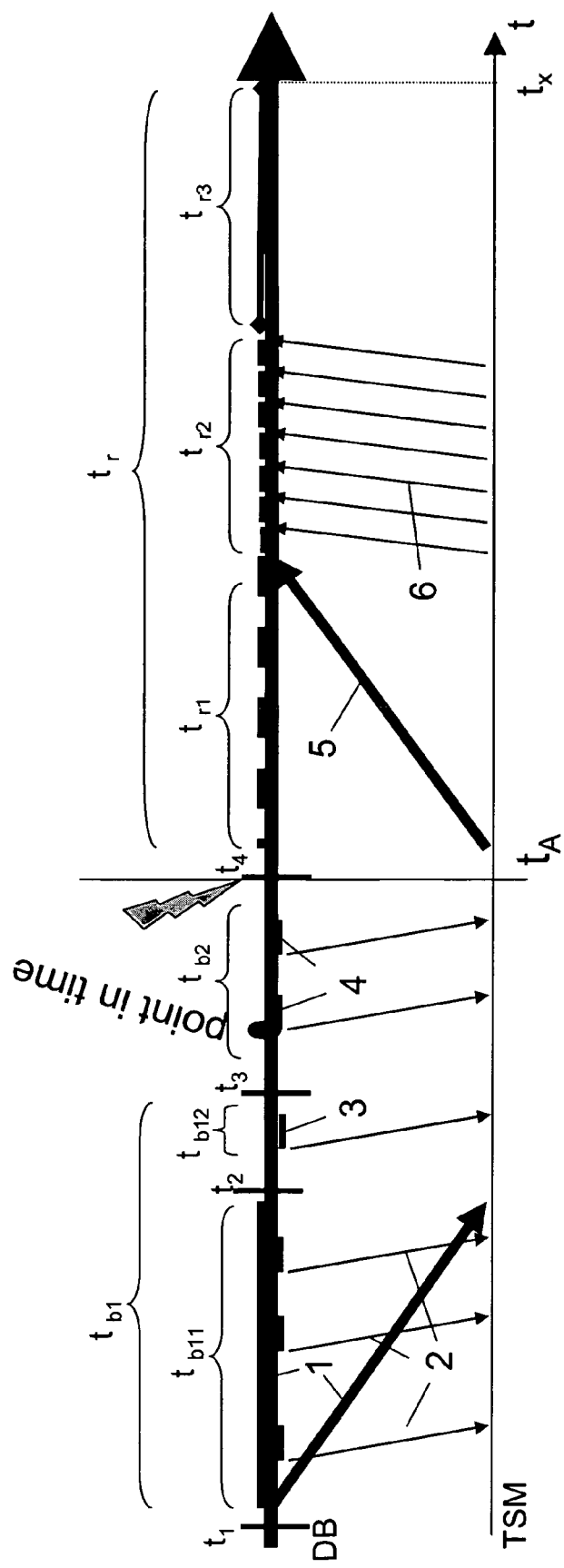
FIG. 3 shows a schematic diagram showing a time lapse of an online backup and a succeeding recovery according to an embodiment of the method according to the present invention.

FIG. 3 shows an application system DB and a backup storage system TSM. The backup storage system TSM can be for example a so-called Tivoli Storage Manager, a product of IBM®. As part of the IBM TotalStorage® Open Software Family, IBM Tivoli Storage Manager empowers an user with a flexible backup method for his computer system. The Tivoli Storage Manager is mainly adapted to specific operating systems, as for example to a so-called AIX system. The operating system AIX is a so-called file system which expands over a so-called logical volume. The Tivoli Storage Manager helps to protect data and to provide bare metal restore capabilities. It offers a comprehensive system backup, restore and reinstallation tool.

The application system DB and the backup storage system TSM are linked with each other over a time bar. The backup storage system TSM manages backups of data files 1 and redologs 2, 3 and 4 of the application system DB. Furthermore, the backup storage system TSM keeps records of the amount of data of both types, namely of backups of data files 1 of the application system DB and archives of redologs of the application system DB. In case of an online backup all redologs produced during the online backup mode $t_{b11}$, need to be saved by the backup storage system TSM as indicated by reference number 2. After completion of this backup process the application system DB will be set in normal operation mode at a point in time $t_2$. Since there may be open transactions within the application system DB at the end of the backup process at point in time $t_2$ the latest redologs 3 need to be saved in addition in a time period $t_{b12}$ when all transactions are closed which where open during $t_{b11}$. This means a complete consistent set of application data exists within the backup repository not before the point in time $t_3$ when this "de-layed" redologs are saved. That means that a complete backup takes a period in time $t_{b1}$ corresponding to the sum $t_{b11}+t_{b12}$. An indicated period in time $t_{b2}$ shows that afterwards logs of the application activity, so-called redologs 4 will be written by the application system DB and saved to the backup storage system TSM until the next backup process starts or the application system DB goes offline at a point in time $t_4$. The time bar shows a point in time $t_A$ where a restore/recovery process starts. A further point in time marked as "0" specifies the point in time until to which data should be restored and recovered in order to rebuild the state of the application system DB at this point in time. Changes within the data which happened during "0" and $t_A$ are lost.

Backups are copies of active online data stored on offline storage. Should an online storage device fail, a data error occur or someone accidentally deletes a file, the offline copy of that data can be copied, namely restored, to online storage. The already mentioned Tivoli Storage Manager TSM uses multiple techniques to make data backups and restores as fast, flexible and low-impact as possible.

Knowing the amount of data of both types and the time it consumes to execute the backups of data files 1 and archives of redologs 2 and 3 of the application system DB and the knowledge about the internal performance of the system, the time it will consume to restore the data from the backup can be calculated. The time it will consume to restore this data from the backup and the corresponding redologs will correspond to $t_{r1}$ and $t_{r2}$ as it is indicated in FIG. 3. It is also known how many redologs have been archived since any specific backup up to the point in time 0. This can be designated as "Size_log_backup". Furthermore, it is known how fast the system can recover its own redologs, called "recover_speed". This value needs to be made available to a certain backup application for instance by typing it for example into a dialog. If the backup application knows about the "Size_log_backup" and the "recovery_speed", it can calculate the plain recovery time, called $t_{r3}$. The plain recovery time $t_{r3}$ results from the following equation:

$$t_{r3} = \frac{\text{Size\_log\_backup}}{\text{recovery\_speed}}$$

The "Size_log_backup" is dependent on a certain point in time an administrator chooses to recover the backup. The more early this point is in time the more will the "Size_log_backup" decrease. The recovery time $t_{r3}$ is direct proportional to the "Size_log_backup". Now having all values $t_{r1}$, $t_{r2}$, $t_{r3}$, the overall recovery time $t_r$ will calculate as following:

$$t_r = t_{r1} + t_{r2} + t_{r3}.$$

The calculated value $t_r$ will now either be displayed for review or may directly serve as an input for a schedule mechanism. A user can define how long his business process allows him to be offline with a particular application and may decide to schedule a new backup on demand if a predefined time period is exceeded by the calculated value $t_r$.

Figure 4:
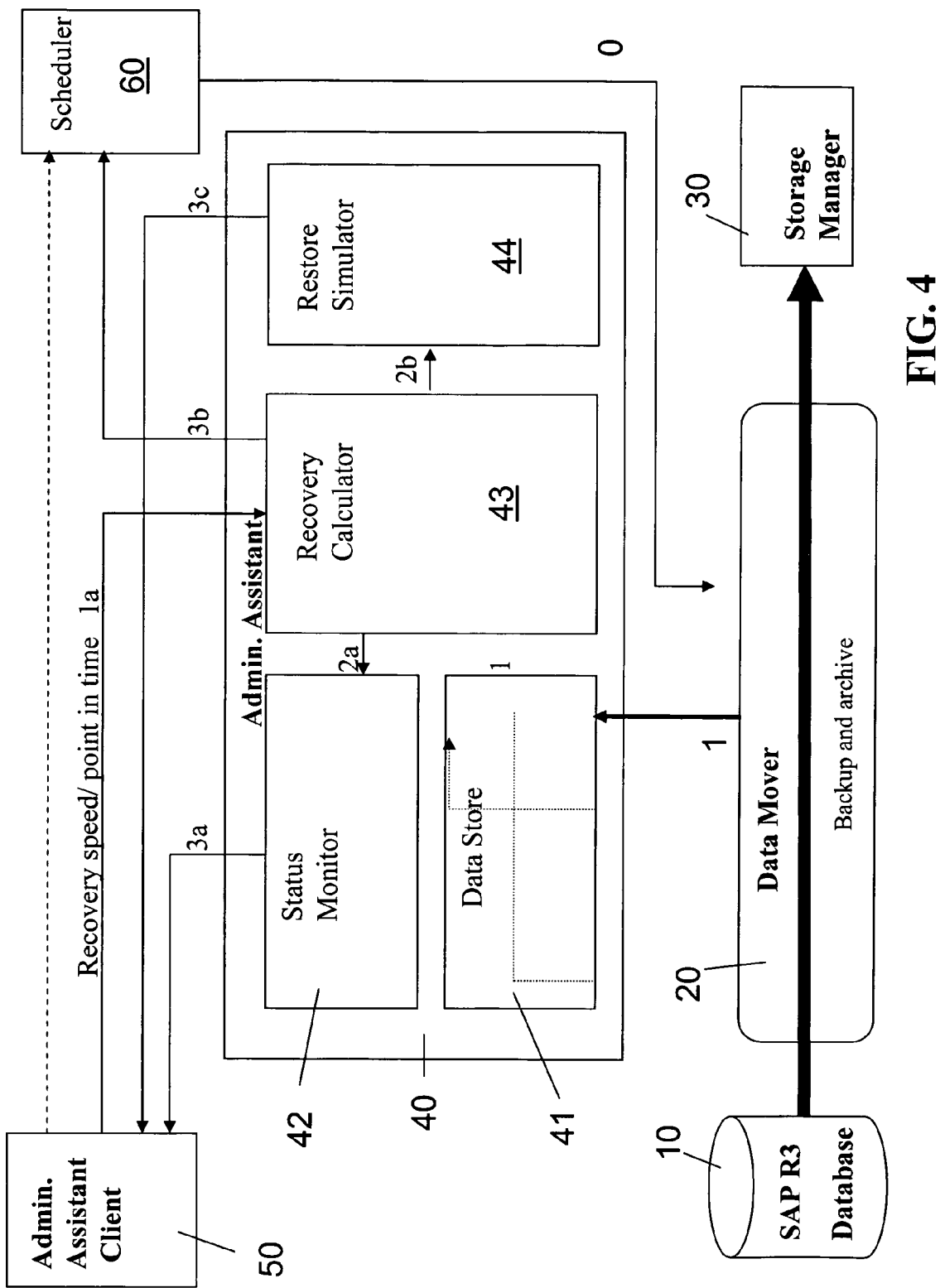
FIG. 4 shows a system diagram showing an embodiment of a computer system according to the present invention.

FIG. 4 shows an example of a computing system according to the present invention, more particularly a backup environment based on existing applications used to protect a so-called SAP R/3 database 10. Backup/restore processing of the database 10 is done by a database specific unit 20, called Data Mover and a further specific unit 30, called Storage Manager. FIG. 4 also shows a so-called Administration Assistant 40 providing system administrators with means to administer the backup/restore processing. The Administration Assistant 40 is implemented as a client/server application. The Administration Assistant 40 comprises a server 41. The server 41 stores performance data received from the Data Mover 20. On its' browser based client it provides the user with several monitor panels like a performance monitor or a system Status Monitor 42.

For every backup and archive process the process duration and the amount of data saved and the amount of redologs archived are transferred to the Administration Assistant server 41 and stored in its' history. A calculating unit 43, called Recovery Calculator 43 is provided which has to be initialised by a user by means of an Administration Assistant Client 50 specifying a system's recovery speed, a time interval indicating up to which point of time after the last backup the system has to be recoverable and a predefined time period $t_0$ corresponding to a maximum time frame for a recovery process. This is done over a connection 1a. The Recovery Calculator 43 uses this data and the duration and data amount values from the Data Store 41 (connection 1) to calculate an overall recovery time $t_r$. It then compares the overall recovery time $t_r$ with the predefined maximum recovery time $t_0$. Depending on the result of this comparison appropriate actions are taken. There are three different ways the result can be handled:

The result will be sent over a connection 2a to the Status Monitor 42. Within this monitor 42 a new column "recovery status" will be updated. The corresponding monitor panel can be viewed with the Administration Assistant Client 50 over a connection 3a.

If the overall recovery time $t_r$ exceeds the maximum recovery time $t_0$ an existing scheduler application 60, e.g. a Tivoli Workload Scheduler, may be called to schedule/start a new backup, indicated by a connection 3b.

Alternatively the user may want to try to optimise the restore process by calling a simulator module 44, called Restore Simulator. The simulator 44 will automatically vary all performance relevant configuration parameters of the application system to find the minimum restore duration and will suggest an optimised configuration parameter set which the user can then decide to apply. This is indicated by a connection 3c.

Figure 5:
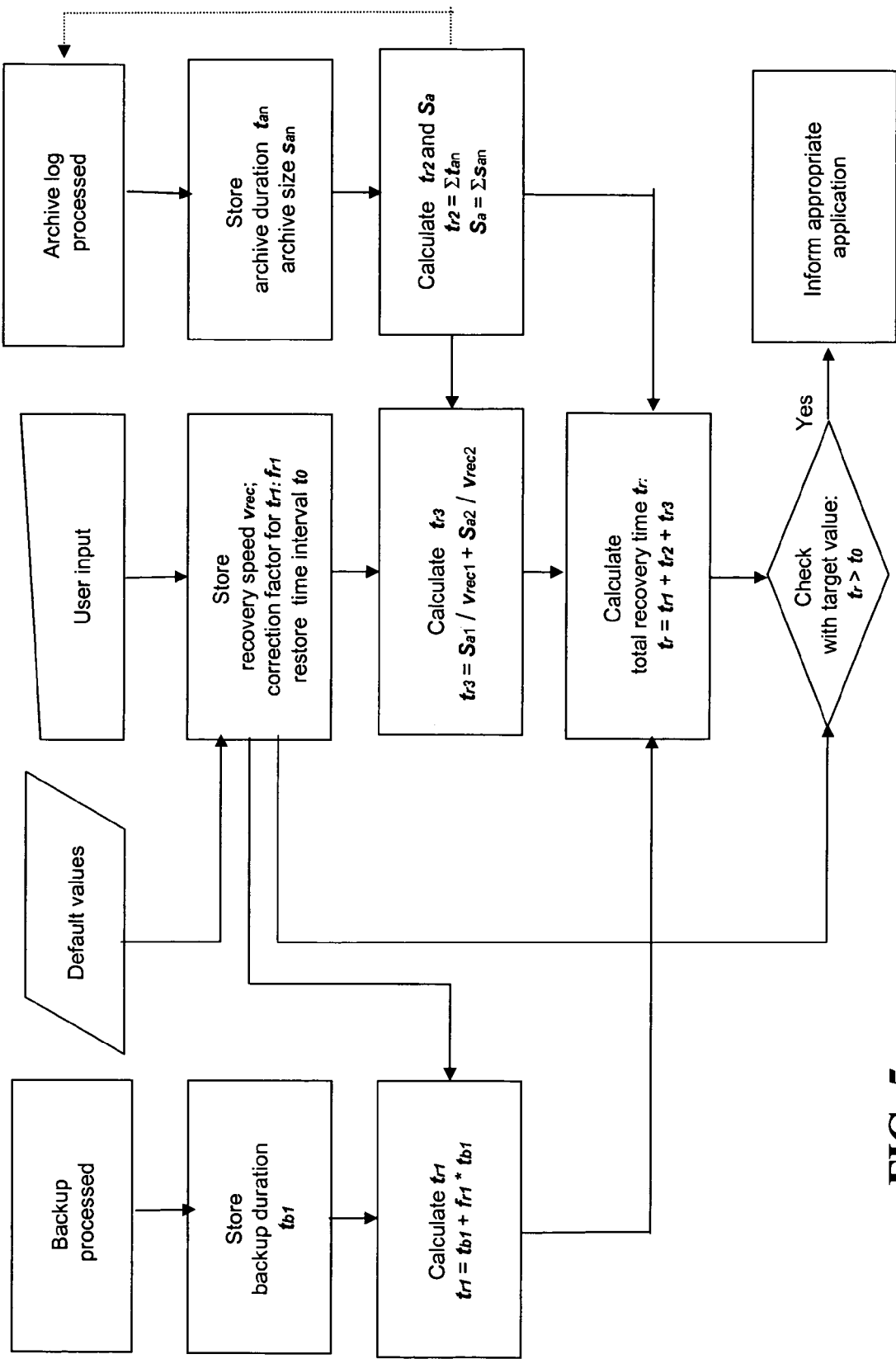
FIG. 5 shows a flowchart of another embodiment of the method according to the present invention.

FIG. 5 shows a flowchart representing a recovery time calculation for online backups of an application system according to a possible embodiment of the method according to the present invention. A calculating unit of an appropriate computing system which does the calculation holds a set of default values:

a predefined time period, namely a target restore interval $T_0$ which will be used as a reference and should not be exceeded, recovery speed values $v_{rec1}$ and $v_{rec2}$ for different redolog types. There are generally two types of redologs, namely those which are performed during a backup, represented by a1, and those which are performed after a backup, signed as a2.

a correction factor $f_{r1}$ which has to be used to calculate the restore time of the saved data files.

All these values can be adapted by a user at any time. After a data file backup has been finished the calculating unit stores the corresponding backup duration $t_{b1}$. This value can be used to calculate the time $t_{r1}$ necessary to restore this data. According to experience the restore lasts a little longer than the corresponding backup. The relation between $t_{b1}$ and $t_{r1}$ can be expressed as following:

$$t_{r1} = t_{b1} + f_r \cdot t_{b1}$$

Accordingly the restore time for the redologs is a little longer than the corresponding archive:

$$t_{r2} = t_{b2} + f_r \cdot t_{b2}$$

The correction factor $f_r$ has been found by experience (~0.15).

Archiving of redologs may already start while the data file backup is being processed. As already mentioned, there is a difference between archives being processed during a backup and those being processed after the backup has been finished. Redologs that are written during a backup contain much more data for a comparable content than those written after the backup has been finished. As the recovery time is not proportional to the amount of data but to the content to be restored, the recovery speed for the former redologs (created during the backup) $v_{rec1}$ is a little higher than $V_{rec2}$. This leads to different recovery speed values $V_{rec1}$ and $V_{rec2}$ for both archive types. For every finished archive the calculator adds the duration $t_a$ to the total restore time $t_{r2}$ and depending on the archive type (performed during a backup: $a_1$ or after a backup: $a_2$) the amount of data saved is added to $S_{a1}$ or $S_{a2}$. The recovery time $t_{r3}$ for all redologs can be calculated with the following expression:

$$t_{r3} = S_{a1}/v_{rec1} + S_{a2}/V_{rec2}$$

The total recovery duration $t_r$ can be calculated with:

$$t_r = t_{r1} + t_{r2} + t_{r3}$$

The result $t_r$ is finally checked against the predefined time period $t_0$. If $t_0$ is exceeded the appropriate application is informed.

It has to be noted that the calculation for offline backups can be done with the same algorism. In this case only archives after a finished backup are processed.

Figure 6:
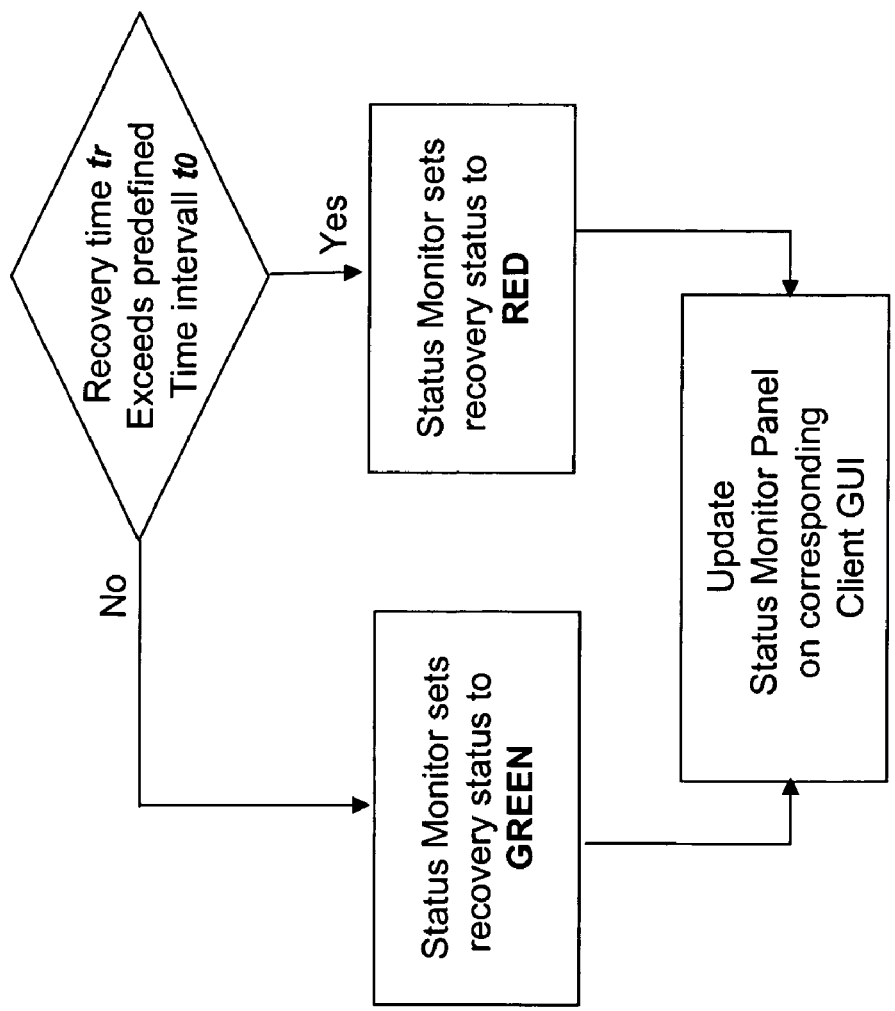
FIG. 6 shows a possible implementation of the method according to the present invention.

FIG. 6 shows a possible implementation of the method according to the present invention where only visual (and accustic) warnings are presented to a user. An existing monitor application which provides a set of status information can be enhanced to show an additional value for a recovery interval, namely a recovery time $t_r$. Depending on the time limit exceedance the recovery interval status may be displayed as a red or green indicator on a corresponding client GUI (graphical user interface).

Figure 7:
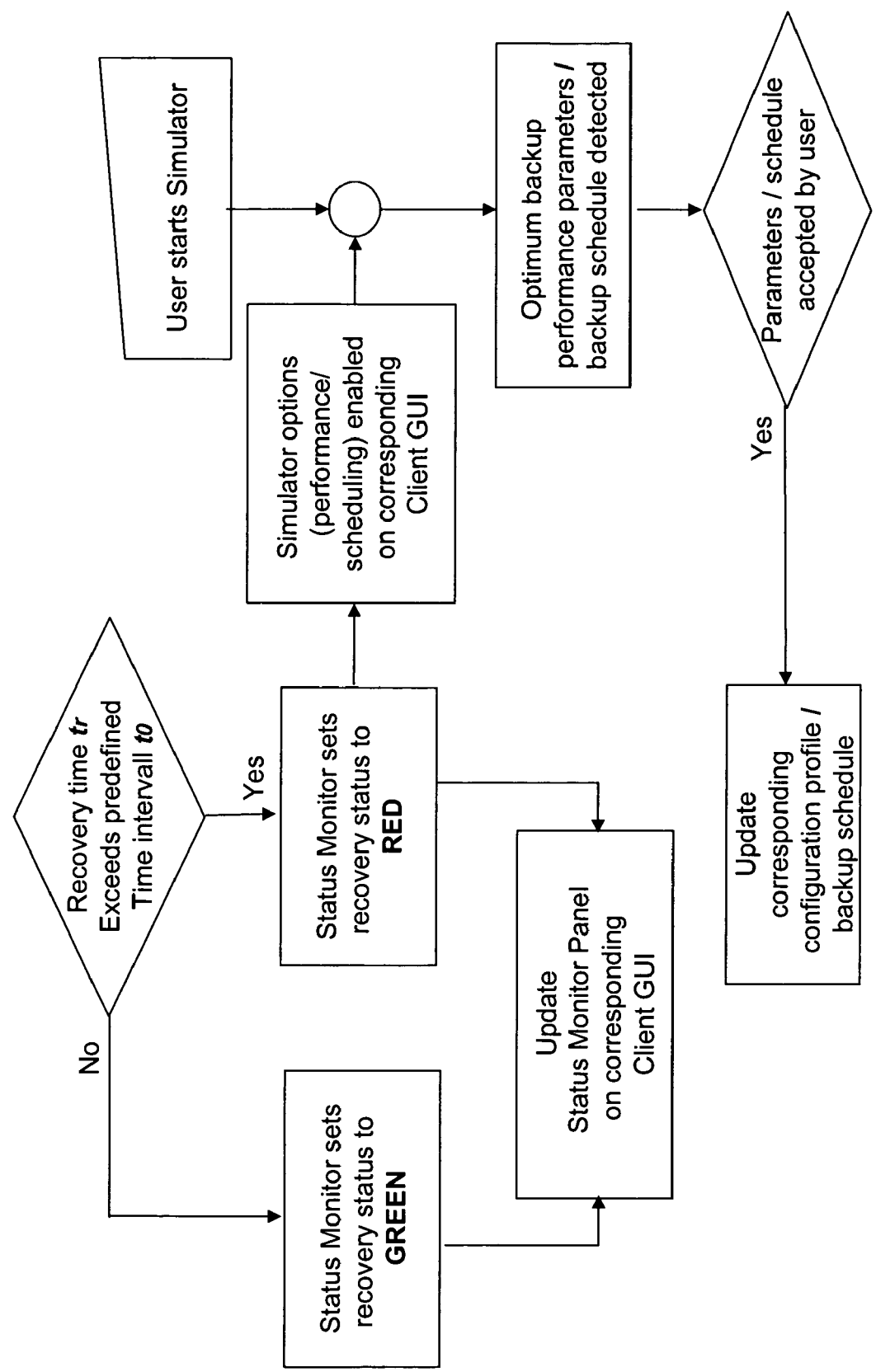
FIG. 7 shows another possible implementation of the method according to the present invention.

FIG. 7 shows another possible implementation variant of the method according to the present invention where visual (and accustic) warnings are combined with additional features for backup optimization. An existing monitor application which provides a set of status information can be enhanced to show an additional value for a recovery interval, namely a recovery time $t_r$.

It is possible to implement a kind of assistant during a restore/recovery process. As already stated, the recovery time $t_{r3}$ and thus the overall recovery time $t_r$ is dependent on the point in time "0" recover to. Having this knowledge, the implemented assistant can support an administrator for a recovery by proposing a point in time that can be recovered within the predefined time period, namely a maximum recovery window. Also there might be parameters available to tweak the restore time where the assistant can also either propose or automatically change values to meet the maximum recovery window with an efficient use of available resources as for example tape drives, network connections, priority for copy processes etc. These are parameters which are available to tweaken the restore times.

Depending on the time limit exceedance the recovery interval status may be displayed as a red or green indicator on a corresponding client GUI. In case of a red indicator a user will be able to start a simulation process. Two different enhancement procedures are conceivable.

It is possible to perform a parameter optimization. In this case a simulator automatically checks all possible parameter combinations and determines the optimum performance parameters. The result is presented to the user who then can decide to accept the new settings. An update of the configuration profiles may be automatically done by the application system or manually by the user.

Furthermore, it is possible to perform a backup schedule optimization. In this case a scheduler tries to increase the number of backups to reduce the total recovery time. The new schedule is presented to the user who then can decide to accept the new settings.

Figure 8:
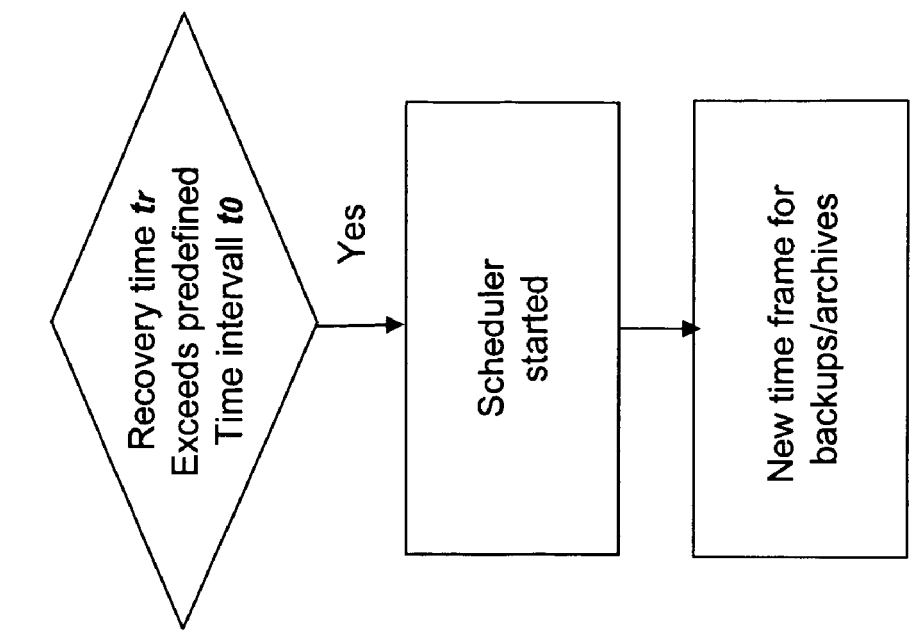
FIG. 8 shows a further possible implementation of the method according to the present invention.

FIG. 8 shows still another implementation variant of the method according to the present invention where an automatic re-scheduling mechanism starts in case a predefined time period $t_0$ has been exceeded by a calculated recovery time $t_r$. A scheduler tries to increase the number of backups to reduce the total recovery time $t_r$.

We claim:

1. A method, in a data processing system, for calculating a recovery time of an application system in a computer system for tuning the computer system dynamically, the method comprising:

determining, by a recovery calculator of the data processing system, a type of redolog used during a backup process and a corresponding recovery speed value associated with the type of redolog, wherein the type of redolog is one of a plurality of different types of redologs, and wherein the recovery speed value associated with the type of redolog is different from recovery speed values of other types of redologs in the plurality of types of redologs;

calculating, by the recovery calculator, the recovery time based on the type of redolog used during the backup process and the corresponding recovery speed value associated with the type of redolog;

comparing, by the recovery calculator, the calculated recovery time to a predefined maximum recovery time period; and setting a trigger, in a status monitor of the data processing system, for performing an operation in response to the calculated recovery time exceeding the predefined maximum recovery time period.

2. The method according to claim 1, wherein the calculated recovery time is isochronously displayed for review.

3. The method according to claim 1, wherein, the trigger initiates a warning signal for a user.

4. The method according to claim 1, wherein the trigger initiates a warning signal combined with an activation of additional appropriate system resources for reducing the recovery time.

5. The method according to claim 1, wherein the trigger enables simulator options on a corresponding client for modulating systematically backup performance parameters.

6. The method according to claim 1, wherein an execution plan for a subsequent backup process is generated on the basis of the calculation of the recovery time, the execution plan comprising a schedule of the execution of the subsequent backup process and the subsequent backup process being executed on demand according to the execution plan schedule.

7. The method according to claim 1, wherein the recovery time is determined using the following system parameters: backup duration of saved data of the application system, an amount of associated redologs of the application system, throughput values for a backup of the redologs, and an overall throughput for a recovery of the saved data with the associated redologs.

8. A data processing system, comprising:

a recovery calculator unit in the data processing system; and a status monitor unit, in the data processing system, coupled to the recovery calculator unit, wherein the recovery calculator unit:

determines a type of redolog used during a backup process and a corresponding recovery speed value associated with the type of redolog, wherein the type of redolog is one of a plurality of different types of redologs, and wherein the recovery speed value associated with the type of redolog is different from recovery speed values of other types of redologs in the plurality of types of redologs, calculates a recovery time based on the type of redolog used during the backup process and the corresponding recovery speed value associated with the type of redolog, compares the calculated recovery time to a predefined maximum recovery time period, and sets a trigger, in the status monitory unit, for performing an operation in response to the calculated recovery time exceeding the predefined maximum recovery time period.

9. The computing system according to claim 8, wherein the status monitor unit outputs the calculated recovery time to be isochronously displayed for review.

10. The computing system according to claim 8, further comprising a generating unit for generating an execution plan for a subsequent backup process on the basis of the calculation of the recovery time, the execution plan comprising a schedule of the execution of the subsequent backup according to which the subsequent backup can be executed.

11. The computing system according to claim 8, wherein the recovery time is determined using the following system parameters: backup duration of saved data of the application system, an amount of associated redologs of the application system, throughput values for a backup of the redologs and an overall throughput for a recovery of the saved data with the associated redologs.

12. A computer program product in a computer-readable storage medium for carrying out a method when the computer program is run on a computer, the method comprising:
 determining a type of redolog used during a backup process and a corresponding recovery speed value associated with the type of redolog, wherein the type of redolog is one of a plurality of different types of redologs, and wherein the recovery speed value associated with the type of redolog is different from recovery speed values of other types of redologs in the plurality of types of redologs;
 calculating a recovery time of an application system in a computer system based on the type of redolog used during the backup process and the corresponding recovery speed value associated with the type of redolog;
 comparing the calculated recovery time to a predefined maximum recovery time period; and
 setting a trigger for performing an operation in response to the calculated recovery time exceeding the predefined maximum recovery time period.

13. The method of claim 1, wherein calculating the recovery time further comprises:
 calculating a backup duration for the backup process after completion of the backup process; and
 calculating the recovery time based on the backup duration and a correction factor, wherein the correction factor represents an adjustment of the backup duration indicative of an amount of time in excess of the backup duration required to perform a restore operation based on the data stored by the backup process.

14. The method of claim 1, wherein calculating the recovery time further comprises:
 calculating the recovery time based on a combination of a first value and a second value, wherein the first value is calculated as an amount of data saved during the backup process using a first redolog type, divided by a recovery speed value corresponding to the first redolog type, and wherein the second value is calculated as an amount of data saved during the backup process using a second redolog type, different from the first redolog type, divided by a recovery speed value corresponding to the second redolog type.

15. The method of claim 1, wherein the plurality of types of redologs comprises a first type of redolog in which the redolog is generated during the backup process, and a second type of redolog in which the redolog is generated after the backup process is completed.

16. The method of claim 1, wherein the trigger initiates a simulator that varies performance related configuration parameters of an application system of the data processing system to determine a minimum restore duration and provides an output to a user indicating configuration parameters corresponding to the minimum restore duration.

17. The computer program product of claim 12, wherein calculating the recovery time further comprises:
 calculating a backup duration for the backup process after completion of the backup process; and
 calculating the recovery time based on the backup duration and a correction factor, wherein the correction factor represents an adjustment of the backup duration indicative of an amount of time in excess of the backup duration required to perform a restore operation based on the data stored by the backup process.

18. The computer program product of claim 12, wherein calculating the recovery time further comprises:
 calculating the recovery time based on a combination of a first value and a second value, wherein the first value is calculated as an amount of data saved during the backup process using a first redolog type, divided by a recovery speed value corresponding to the first redolog type, and wherein the second value is calculated as an amount of data saved during the backup process using a second redolog type, different from the first redolog type, divided by a recovery speed value corresponding to the second redolog type.

19. The computer program product of claim 12, wherein the plurality of types of redologs comprises a first type of redolog in which the redolog is generated during the backup process, and a second type of redolog in which the redolog is generated after the backup process is completed.

20. The computer program product of claim 12, wherein the trigger initiates a simulator that varies performance related configuration parameters of an application system of the data processing system to determine a minimum restore duration and provides an output to a user indicating configuration parameters corresponding to the minimum restore duration.

* * * * *